Jan. 5, 1932.                C. BREER                 1,840,081
                              CHAIN
                        Filed Oct. 14, 1926

Inventor
Carl Breer
By Jhing Harness
Attorney

Patented Jan. 5, 1932

1,840,081

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

CHAIN

Application filed October 14, 1926. Serial No. 141,538.

This invention relates to chains and more particularly to continuous link chains commonly used for the cam shaft drive in automobile engines.

In the use of the ordinary chain considerable difficulty has been experienced in eliminating undesirable noise and vibration caused by the periodic vibration or whip of the chain. Various methods have been employed in attempts to dampen or eliminate this objection but with little success.

As a desirable means of accomplishing this result and as an important object of this invention, friction devices have been positioned throughout the perimeter of the chain at varying intervals to eliminate synchronous chain whip; the object being to have the friction devices located in an unsymmetrical manner such that the friction effect on a given length of free running chain will break up the periodic action.

Another object of the invention is to construct and arrange the friction devices within the chain as links, either to frictionally engage the gear over which the chain travels or frictionally engage adjacent links such as to give more rigidity to that portion of the chain.

These and other objects of the invention will more fully appear from the following description taken in connection with the accompanying drawings, in which.

Figure 1:
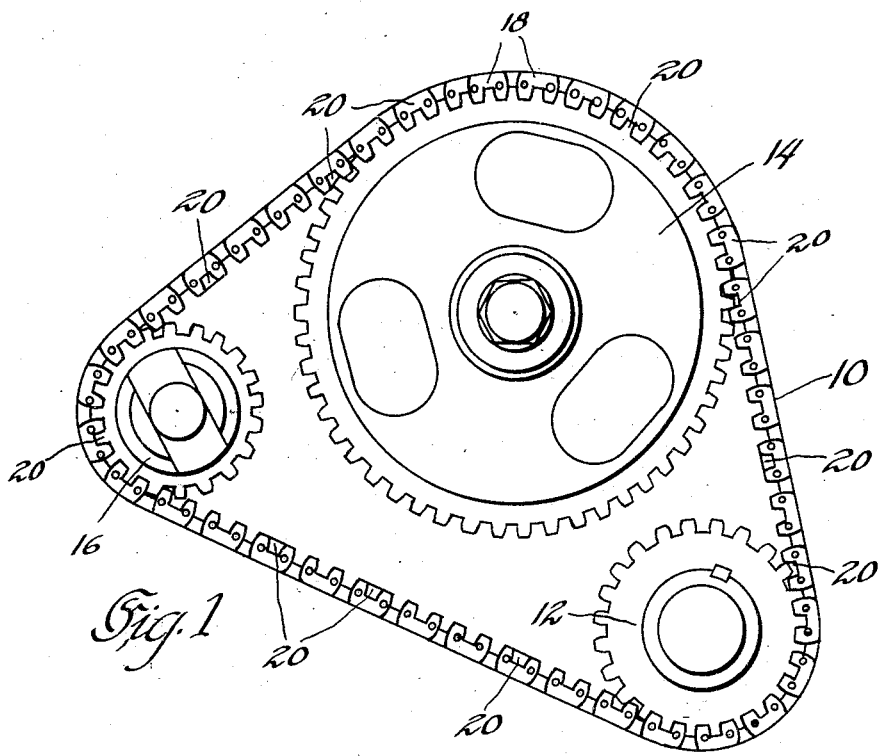
Fig. 1 is a view showing a front end drive with a chain made in accordance with my invention.
Figure 2:
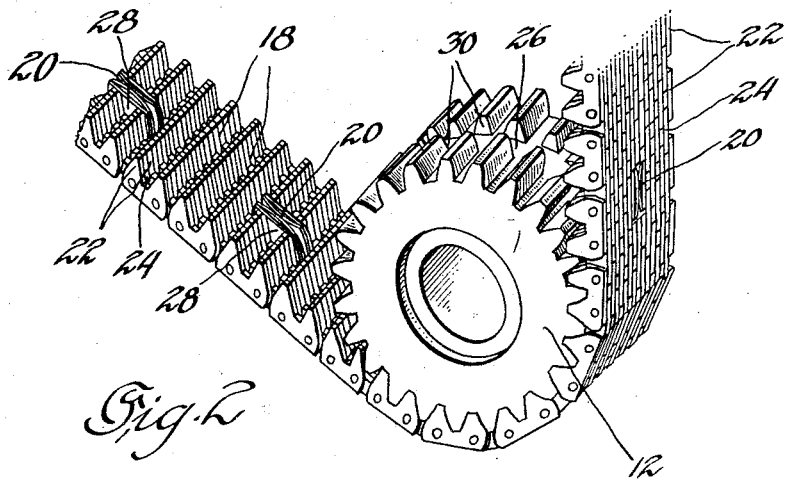
Fig. 2 is a perspective of a portion of the chain.

Referring to the illustrated embodiment of my invention, a link chain 10 is shown in connection with the front end drive of an automobile engine comprising a crankshaft gear 12, camshaft gear 14 and generator gear 16.

The chain 10 is built up of the usual links 18 and at unequal intervals, friction links 20 are employed. The links 18 are formed by pivotally riveting a plurality of double toothed segments 22 together each spaced from the other by corresponding tooth segments 24 connecting each set of aligned double toothed members.

The friction links 20 have been illustrated as spring plates substituted for one or more of the double toothed segments 22. Four plates have been shown adapted to exert friction between the aligned segments adjacent the friction link, thus making the chain more rigid at that point which will break up the periodic vibration of the chain.

Where the friction links are designed to project from the base of the teeth to the top of the teeth and extending from one tooth to another, friction may be obtained between the chain and gear over which the chain travels. In this form the gear 12 is provided with a circumferential slot 26 formed in the teeth and the sides 28 of the friction links 20 frictionally engage the sides 30 of the gear teeth.

The friction links are located unsymmetrically throughout the perimeter of the chain so that different periods of vibration may be set up in the free length of the chain which counteract one another. Consequently, there will be no common natural period of the chain in which it will periodically vibrate.

It will be understood that the illustrated embodiment of my invention is only one form in which friction is unsymmetrically applied to the chain, that various changes such as the arrangement of parts, size and form may be made without departing from the spirit of my invention and it is not my intention to limit its scope other than by the terms of the appended claims.

What I claim is:

1. A continuous link chain of the class described having friction devices spaced at unequal intervals throughout its perimeter.

2. A continuous link chain of the class described having a plurality of links, and friction links arranged at unequal intervals throughout its perimeter.

3. A continuous link chain of the class described having means arranged at unequal intervals throughout its perimeter for frictionally engaging a gear.

4. A chain drive comprising, in combination, a gear having a circumferential slot formed in the teeth thereof, a chain in engagement with said gear, resilient friction members unequally spaced throughout the perimeter of said chain adapted to frictionally engage the sides of the teeth formed by the circumferential slot in said gear teeth.

5. A continuous link chain of the class described comprising a plurality of toothed segments pivotally connected together, a plurality of corresponding toothed segments spacing said first mentioned segments and connecting another set of pivotally connected toothed segments, and friction devices arranged at unequal intervals throughout the perimeter of said chain giving more rigidity thereto adjacent said friction devices.

CARL BREER.